United States Patent [19]
Ishikawa

[11] Patent Number: 6,129,368
[45] Date of Patent: Oct. 10, 2000

[54] AXLE CONTROLLER FOR INDUSTRIAL VEHICLES

[75] Inventor: Kazuo Ishikawa, Kariya, Japan

[73] Assignee: Kabushiki Kaisha Toyoda Jidoshokki Sesakusho

[21] Appl. No.: 09/047,867

[22] Filed: Mar. 25, 1998

[30] Foreign Application Priority Data

| Mar. 25, 1997 | [JP] | Japan | 9-071442 |
| Jun. 24, 1997 | [JP] | Japan | 9-167310 |
| Jun. 24, 1997 | [JP] | Japan | 9-167311 |
| Jul. 4, 1997 | [JP] | Japan | 9-179595 |

[51] Int. Cl.$^7$ .................................................. B60G 9/02
[52] U.S. Cl. ........................ 280/124.112; 280/124.16; 188/322.21; 267/64.28
[58] Field of Search ............... 280/124.112, 124.159, 280/124.16, 124.161, FOR 171; 188/300, 266.6, 314, 318, 319.1, 322.21; 267/64.28

[56] References Cited

U.S. PATENT DOCUMENTS

| 3,976,302 | 8/1976 | Hammarstrand . | |
| 4,382,604 | 5/1983 | Nakagawa . | |
| 4,393,959 | 7/1983 | Acker . | |
| 4,655,440 | 4/1987 | Eckert | 267/64.11 |
| 4,786,034 | 11/1988 | Heess et al. | 267/64.15 |
| 4,936,423 | 6/1990 | Karnopp | 188/299 |
| 5,020,826 | 6/1991 | Stecklein et al. | 280/707 |
| 5,024,302 | 6/1991 | Karnopp . | |
| 5,586,627 | 12/1996 | Nezu et al. | 188/299 |
| 5,639,119 | 6/1997 | Plate et al. | 280/754 |
| 5,682,980 | 11/1997 | Reybrouck | 280/714 |
| 5,901,820 | 5/1999 | Kashiwagi et al. | 188/266.6 |

FOREIGN PATENT DOCUMENTS

| 39 23 266A1 | 1/1990 | Germany . |
| 42 35 264A1 | 4/1994 | Germany . |
| 58-167215 A | 10/1983 | Japan . |
| 58-211903 A | 12/1983 | Japan . |
| 05038912 | 2/1993 | Japan . |
| 05213025 | 8/1993 | Japan . |
| 05221212 | 8/1993 | Japan . |
| 10009215 | 1/1998 | Japan . |

*Primary Examiner*—Brian L. Johnson
*Assistant Examiner*—David R. Dunn
*Attorney, Agent, or Firm*—Morgan & Finnegan, L.L.P.

[57] ABSTRACT

An industrial vehicle having an axle pivotally supported on a frame. The vehicle includes a damper for connecting the axle to the frame. The damper allows pivotal motion of the axle when the damper expands or contracts. A conduit is connected to the damper for supplying oil to the damper and for discharging the oil from the damper. A control valve is connected to the conduit to selectively open and close the conduit. A controller controls the control valve. Oil is permitted to enter and exit when the conduit is opened by the control valve. The supply of the oil from the conduit is closed by the control valve. A pressure adjuster is connected to the conduit for accommodating increases in the oil pressure in the conduit when the conduit is opened and for replenishing the conduit with oil due to losses from leakage.

8 Claims, 13 Drawing Sheets

AXLE CONTROLLER FOR INDUSTRIAL VEHICLES

BACKGROUND OF THE INVENTION

The present invention relates to industrial vehicles having body frames that are tiltably supported by axles, and more particularly, to hydraulic circuits for controlling the tilting of axles.

In the prior art, forklifts having body frames that are tiltably supported by axles have been proposed to improve the driving performance and comfort of the vehicle. If such a forklift is steered to change directions, lateral acceleration (centrifugal force) acts on the vehicle and tilts the forklift. This destabilizes the steering performance of the forklift and prevents the speed of the forklift from being increased.

Japanese Unexamined Patent Publication No. 58-211903 describes a forklift that has a turn detector for detecting centrifugal force produced when the vehicle changes directions. If the detected centrifugal force exceeds a predetermined value, a locking mechanism locks the axle to the body frame and stabilizes steerage of the forklift.

A damper is arranged between the body frame and the axle to lock the axle to the body frame. Hydraulic oil is communicated to the damper through an oil passage. The damper locks the axle when the oil passage is closed and the flow of oil to the damper is stopped. To unlock the axle, the oil passage is opened. This permits the axle to be tilted with respect to the body frame.

Expansion of the hydraulic oil may result in oil leakage that decreases the hydraulic pressure of the oil passage. However, the hydraulic oil is not replenished in the above prior art forklift despite the oil leakage. This may degrade the damper locking effect that prohibits relative movement between the body frame and the axle.

To maintain the desired damper locking effect, the hydraulic fluid must be replenished periodically to guarantee adequate pressure in the hydraulic circuit. Thus, maintenance of the hydraulic circuit is burdensome.

SUMMARY OF THE INVENTION

Accordingly, the present invention provides an axle controller for industrial vehicles that compensates for hydraulic oil leakage by automatically replenishing the vehicle with oil to guarantee that the axle can be locked with respect to the body frame.

To achieve the above objectives, the present invention provides an industrial vehicle having an axle pivotally supported on a frame. The vehicle includes a damper for connecting the axle to the frame. The damper allows the axle to pivot with respect to the frame when the damper expands or contracts. A conduit is connected with the damper for permitting oil to enter and exit the damper. A control valve device is connected to the conduit for selectively opening and closing the conduit. A controller controls the control valve device. The controller selectively opens the conduit to permit oil to enter the damper from the conduit and selectively closes the conduit to stop fluid from entering the damper from the conduit. A pressure adjuster is normally connected to the conduit. The pressure adjuster replenishes the conduit with fluid if fluid leaks from the damper. The pressure adjuster is disconnected from the conduit when the oil pressure in the conduit increases beyond a predetermined level due to loading of the damper.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A first embodiment according to the present invention will now be described with reference to FIGS. 1 to 5.

Figure 2:
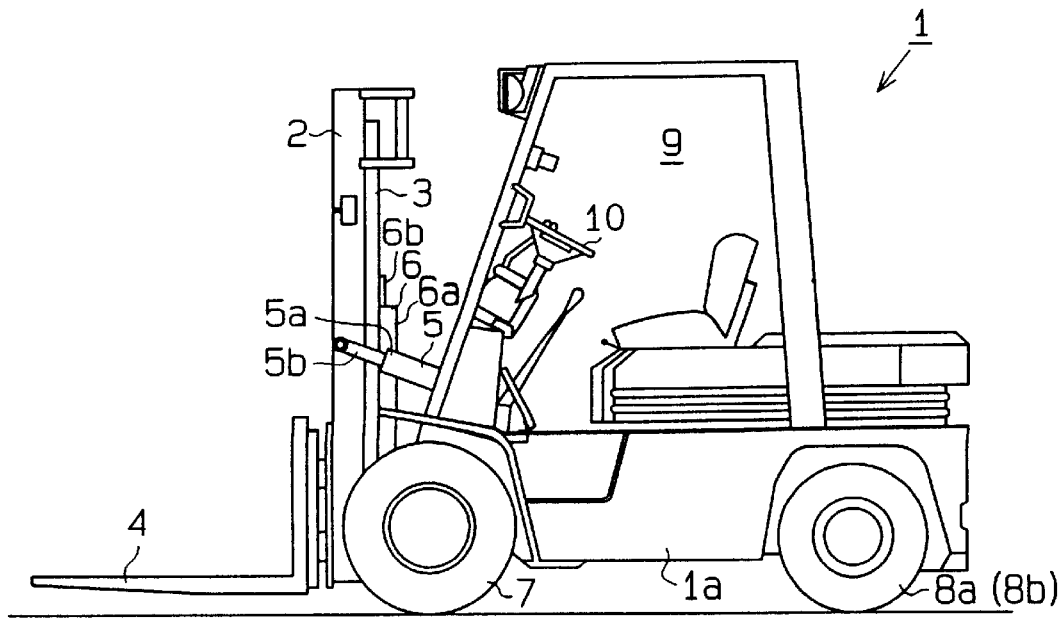
FIG. 2 is a side view showing a forklift.

FIG. 2 is a side view of an industrial vehicle, or forklift 1. A pair of outer masts 2 are arranged on the front of the forklift 1. A pair of inner masts 3 are arranged between the outer masts 2. A fork 4 is mounted on each inner mast 3 and supported so that the fork 4 is lifted and lowered with respect to the inner mast 3. The forks 4 are lifted and lowered with the associated inner masts 3 along the outer masts 2.

The forklift 1 has a body frame 1a. Each outer mast 2 is connected to the body frame 1a by a tilt cylinder 5. Each tilt cylinder 5 has a housing 5a and a piston rod 5b. The housing 5a is secured to the body frame 1a, while the piston rod 5b is secured to the associated outer mast 2. Thus, the outer mast 2 is tilted integrally with the associated fork 4 by the extension and retraction of the piston rod 5b.

Each inner mast 3 is coupled to the associated outer mast 2 by a lift cylinder 6a. The lift cylinder 6 has a housing 6a and a piston rod 6b. The housing 6a is secured to the outer mast 2, while the piston rod 6b is secured to the inner mast 3. Thus, the inner mast 3 is lifted and lowered by the extension and retraction of the piston rod 6b. The associated fork 4 is lifted and lowered accordingly.

A front wheel 7 is housed on each side of the front portion of the body frame 1a. Each front wheel 7 is connected to an engine by a differential ring gear (not shown) and a transmission (not shown). Thus, the front wheels 7 are driven by the engine. A pair of rear wheels 8a, 8b are housed in the rear portion of the body frame 1a.

Figure 1:
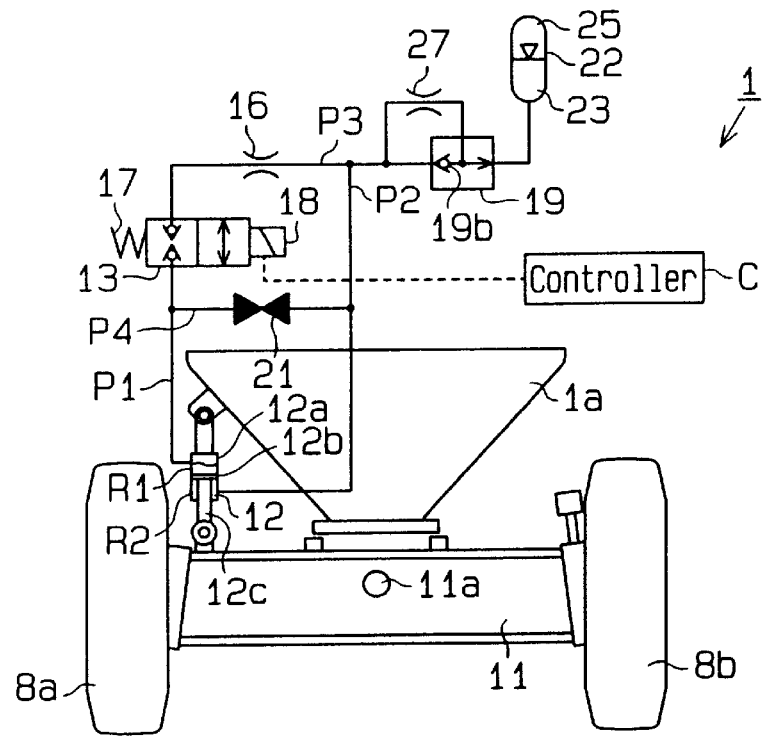
FIG. 1 is a diagrammatic view showing a first embodiment of a rear axle controller according to the present invention.

FIG. 1 is a diagram illustrating a structure for connecting the rear wheels 8a, 8b. The rear wheels 8a, 8b are connected to the ends of a rear axle 11, which extends through the lower rear portion of the body frame 1a. The rear axle 11 pivots about a center pin 11a. The rear wheels 8a, 8b are steered by a steering wheel 10, which is located in a cab 9.

A hyndraulic damper 12 connects the rear axle 11 to the body frame 1a. The damper 12 is a multi-movement hydraulic cylinder that dampens forces applied to the rear wheels 8a, 8b.

Figure 3:
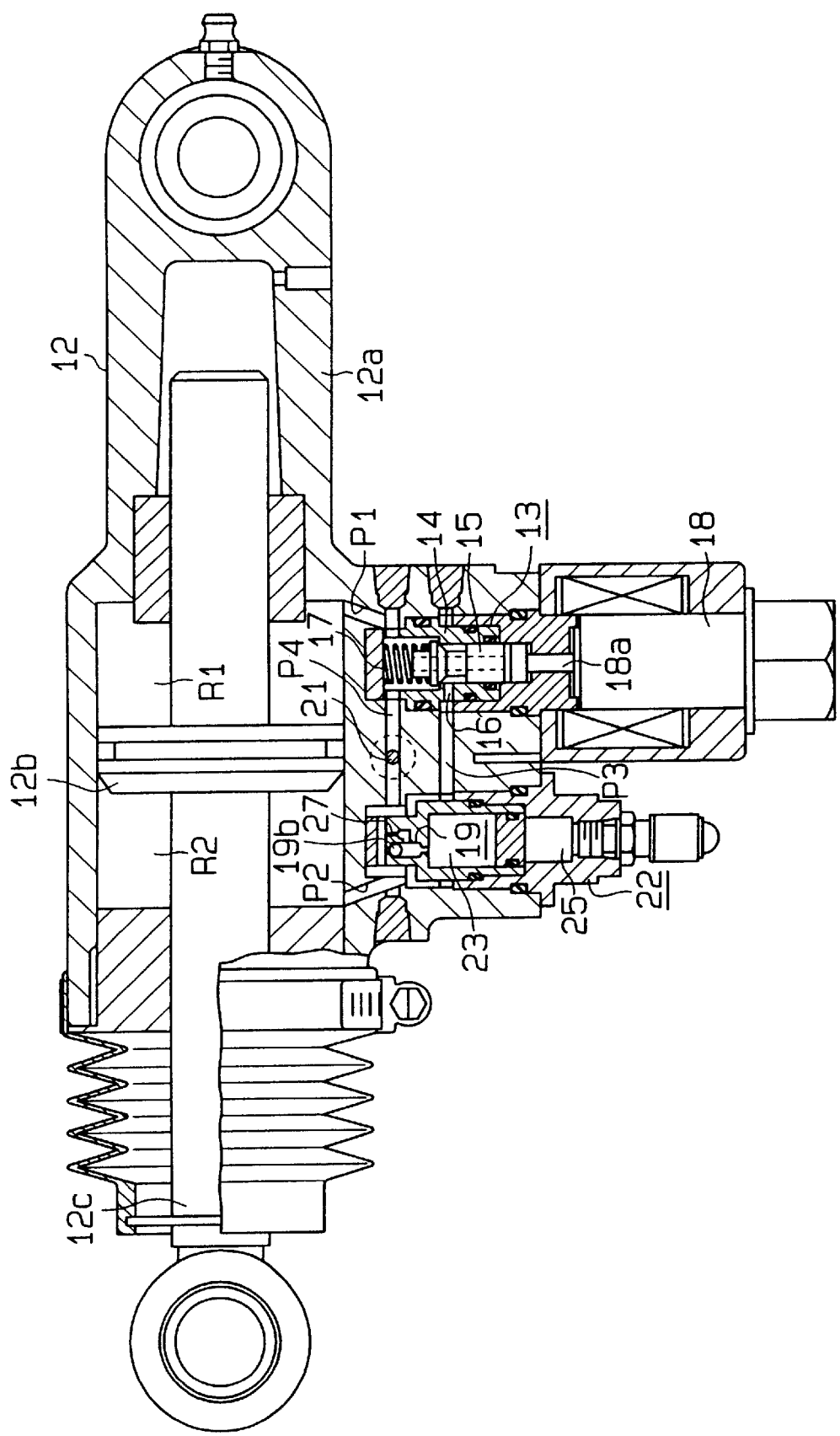
FIG. 3 is a cross-sectional view showing a damper.
Figure 4:
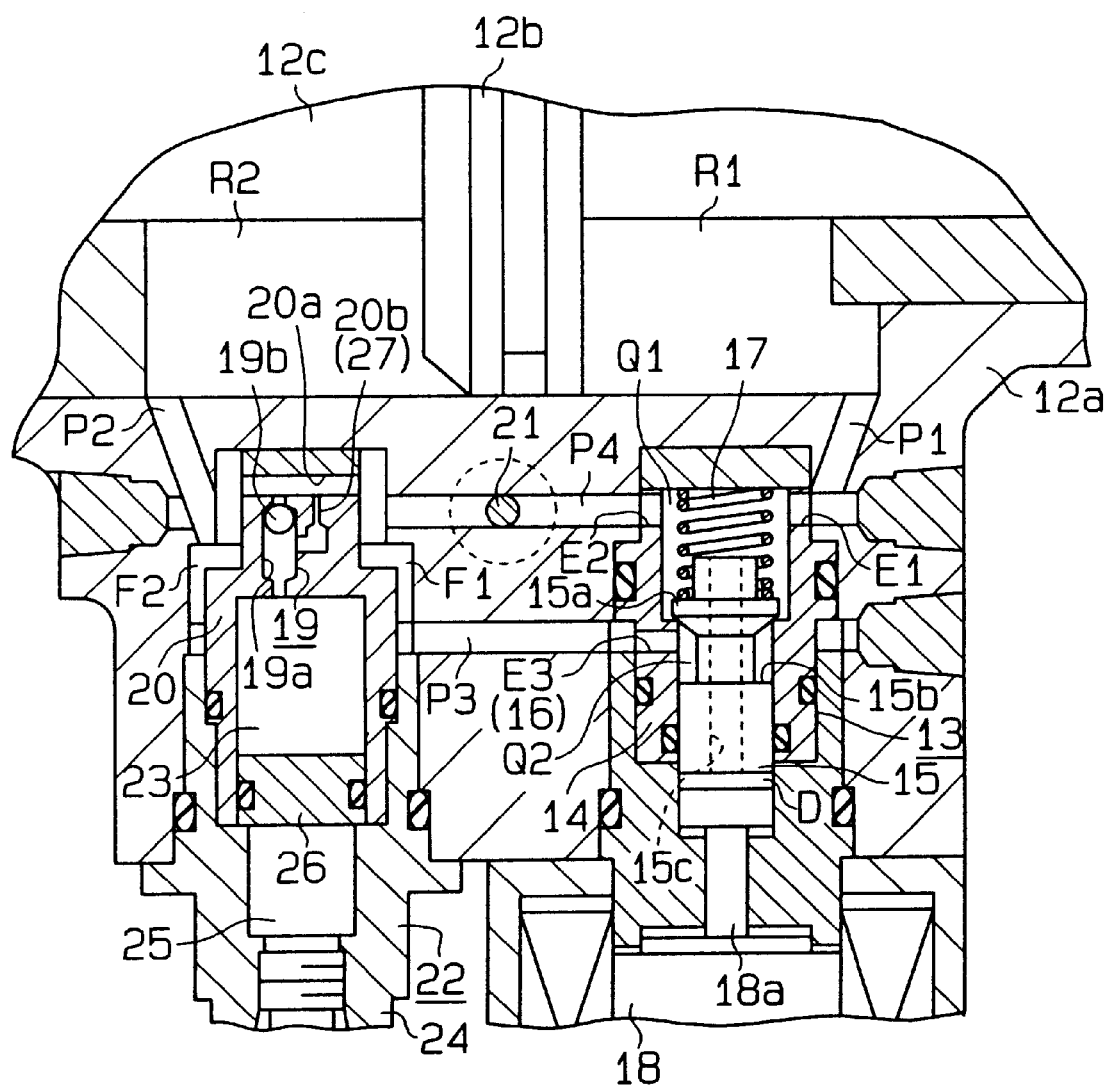
FIG. 4 is an enlarged partial cross-sectional view showing the damper.

As shown in FIGS. 3 and 4, the damper 12 includes a generally cylindrical housing 12a, a piston 12b, and a piston rod 12c. The piston 12b is retained in the housing 12a. The piston rod 12c is fastened to the rear axle 11.

The piston 12b defines a first oil chamber R1 and a second oil chamber R2 in the damper 12. The first oil chamber R1 is connected with a first passage P1, which extends through the housing 12a. The second oil chamber R2 is connected with a second passage P2, which extends through the housing 12a. The first passage P1 is connected to a shutoff valve 13, which functions as a control valve and which is incorporated in the housing 12a.

The shutoff valve 13 has a tubular case 14 and a cylindrical spool 15, which is fit in the case 14. As shown in FIG. 4, first, second, and third communication bores E1, E2, E3 extend through the case 14. The first communication bore E1 is connected with the first passage P1. A first communication chamber Q1 is defined between a basal portion 15a of the spool 15 and the inner walls of the case 14. The first and second communication bores E1, E2 are connected with the first communication chamber Q1.

An annular groove 15b extends about the spool 15. A second communication chamber Q2 is defined between the spool 15 and the inner wall of the case 14 at the location of the groove 15b. The third communication bore E3 is connected with the second communication chamber Q2. The diameter of the third communication bore E3 is smaller than those of the first and second communication bores E1, E2. The third communication bore E3 includes a throttle passage 16 that restricts the amount of hydraulic oil flowing through a third passage P3, as shown schematically in FIG. 1.

A spring 17 is arranged between the basal portion 15a of the spool 15 and the inner wall of the case 14. The spring 17 urges the spool 15 to disconnect the first communication chamber Q1 from the second communication chamber Q2. The shutoff valve 13 further includes an electromagnetic solenoid 18 that includes a plunger 18a. The excitation and de-excitation of the electromagnetic solenoid 18 moves the spool 15. As shown in FIG. 1, a controller C connected to the solenoid 18 controls the excitation and de-excitation of the solenoid 18.

When the operation of the forklift 1 is started, the solenoid 18 is excited to extend the plunger 18a from the solenoid 18 and move the spool 15 against the force of the spring 17. In this state, the first and second communication chambers Q1, Q2 are connected with each other. When the controller C outputs a signal for locking the rear axle 11 to the body frame 1a, the solenoid 18 is de-excited. As a result, the force of the spring 17 moves the spool 15 and disconnects the first and second communication chambers Q1, Q2.

A center bore 15c extends axially through the spool 15. A clearance D is defined between the spool 15 and the plunger 18a. The center bore 15c connects the first communication chamber Q1 with the clearance D. Therefore, the center bore 15c equalizes the pressure of the hydraulic oil in the first communication chamber Q1 with that in the clearance D even if the pressure in the first communication chamber Q1 becomes high. This facilitates the movement of the spool 15.

The third communication bore E3 is connected with the third passage P3, which extends through the housing 12a of the damper 12 toward a shuttle valve 19. The shuttle valve 19 permits oil flow in only one direction and includes a case 20. A first connecting space F1 and a second connecting space F2 are defined between the case 20 and the damper housing 12a. The first and second connecting spaces F1, F2 are located on opposite sides of the case 20. Furthermore, the first connecting space F1 is connected to the third passage P3.

Figure 5:
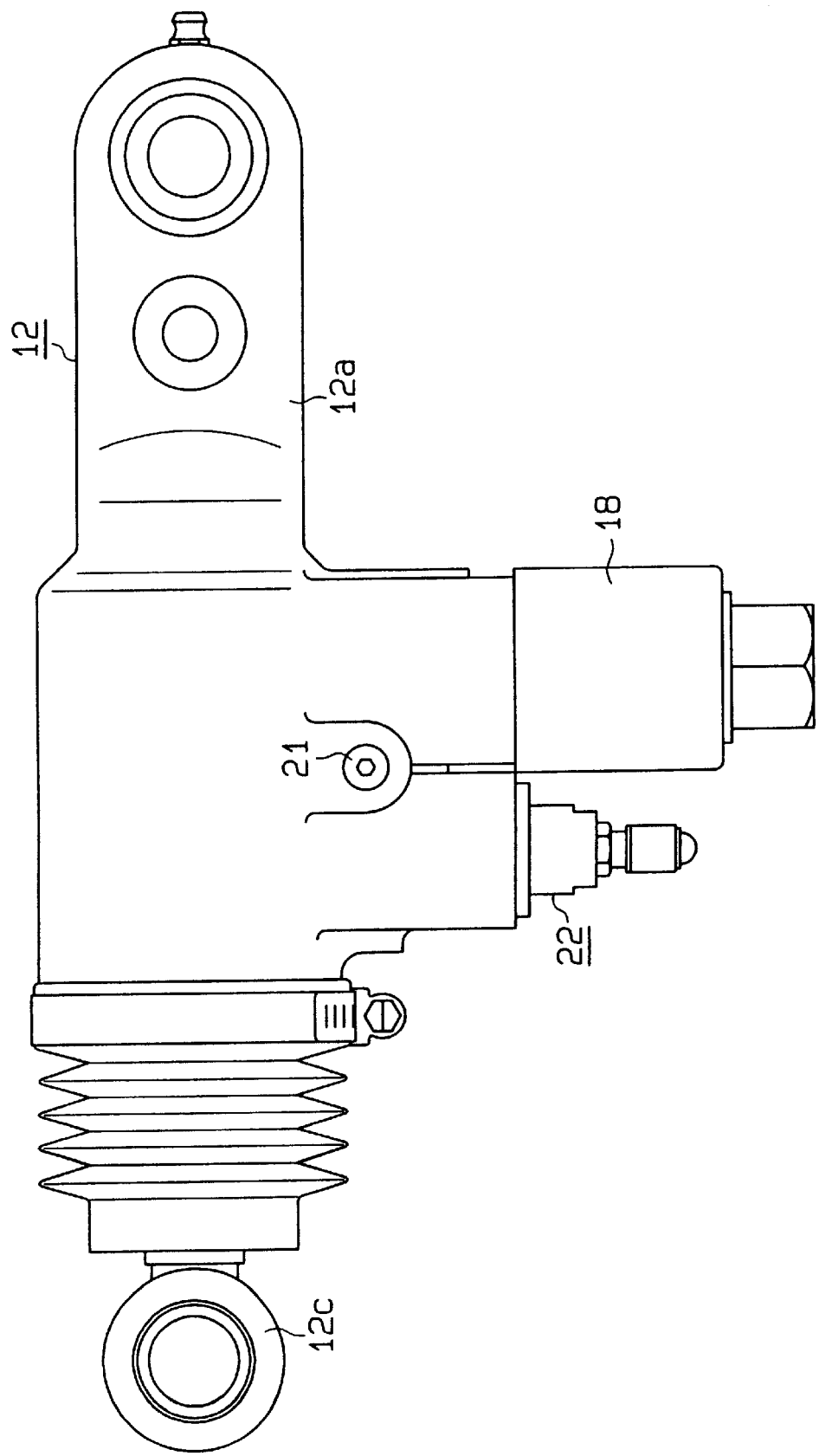
FIG. 5 is a front view showing the damper.

A shutoff valve bypass P4, which extends through the housing 12a, connects the first connecting passage F1 to the second communication bore E2 of the shutoff valve 13. A manual valve 21, which is manipulated from outside the housing 12a as shown in FIG. 5, is arranged in the valve bypass P4. The manipulation of the manual valve 21 from outside the housing 12a opens and closes the valve bypass P4. The valve bypass P4 is normally closed.

The first connecting passage F1 is connected to the second connecting passage F2 through a branch passage 20a, which extends through the case 20 of the shuttle valve 19. The second connecting passage F2 is connected to the second passage P2, which extends from the second oil chamber R2.

An accumulator 22 is located adjacent to the shuttle valve 19. The accumulator 22 includes a switching space 19a, which is used by the shuttle valve 19, and a reservoir chamber 23, which supplies the damper 12 with hydraulic oil. The branch passage 20a is connected to the reservoir chamber 23 through the switching space 19a. The switching space 19a has two orifices. A ball 19b is loosely fitted into the switching space 19a to open and close the orifices. One of the orifices is connected with the branch passage 20a, while the other orifice is connected with the reservoir chamber 23.

The accumulator 22 has a case 24, which is fitted on the case 20 of the shuttle valve 19. A gas chamber 25 is defined in the case 24 by a piston 26. The piston 26 partitions the gas chamber 25 from the reservoir chamber 23. A gas, such as air, compressed to a certain pressure is sealed in the gas chamber 25. The pressure of the air in the gas chamber 25 applies a force to the piston 26. The force applied to the piston 26 is used to maintain the pressure in the reservoir chamber 23 at a predetermined value.

A throttle passage 20b, which extends through the case 20, connects the switching space 19a with the branch passage 20a. The junction between the switching space 19a and the throttle passage 20b defines an outlet. The throttle passage 20b is a throttle 27 that restricts the amount of hydraulic oil flowing between the branch passage 20a and the switching space 19a. In other words, the throttle 27 prevents large pressure fluctuations from affecting the accumulator 22 when a large load is applied to the damper 12.

Among the two orifices, the shuttle valve 19 closes the one having the lower acting pressure with the ball 19b and opens the other orifice. More specifically, the pressure of the hydraulic oil in the reservoir chamber 23 is normally higher than the pressure in the damper 12. Thus, the shuttle valve 19 normally connects the branch passage 20a and the reservoir chamber 23 through the throttle passage 20b, as shown in FIG. 4.

To facilitate illustration in FIG. 1, the shutoff valve 13, the shuttle valve 19, the accumulator 22, the manual valve 21, and the passages P1, P2, P3, P4 are shown separately from the housing 12a of the damper 12. However, as shown in FIGS. 3 and 4, the shutoff valve 13 is either assembled integrally or formed integrally with the housing 12a.

When the operation of the forklift 1 is stopped, the electromagnetic solenoid 18 of the shutoff valve 13 is de-excited, as shown in FIG. 1. Thus, the force of the spring 17 disconnects the first passage P1 from the third passage P3 with the spool 15.

When the forklift 1 is traveling, the solenoid 18 is excited to connect the first passage P1 to the third passage P3. The connection between the first and third passages P1, P3 unlocks the damper 12 and permits the rear axle 11 to be tilted with respect to the body frame 11. When unlocked, the damper 12 dampens forces applied to the rear wheels 8a, 8b and stabilizes the traveling forklift 1.

The pressure of the reservoir chamber 23 in the accumulator 22 is increased to a predetermined value by the gas chamber 25. Thus, the ball 19b in the shuttle valve 19 normally closes the orifice located on the damper 12 side of the space 19a. Accordingly, the accumulator 22 supplies the second and third passages P2, P3 with hydraulic oil regardless of oil leakage from the damper 12. Consequently, the first and second oil chambers R1, R2 and the passages P1, P2, P3 are always filled with an appropriate amount of oil.

If a temperature increase expands the hydraulic oil, an amount of oil corresponding to the expanded volume flows into the reservoir chamber of the accumulator 22 through the throttle 27. Accordingly, the volume expansion of the hydraulic oil is absorbed. This reduces the undesirable effects that volume expansion of the hydraulic oil may have on the damper 12.

If the damper 12 is unlocked when excessive centrifugal force acts on the forklift 1, stable steering of the forklift 1 becomes difficult. In such case, the damper 12 must be locked. Accordingly, the controller C de-excites the solenoid 18 of the shutoff valve 13 to disconnect the first passage P1 from the third passage P3.

If load is applied to the damper 12 when it is locked, the hydraulic pressure in the passages P1, P2, P3 increases and moves the ball 19b in the shuttle valve 19 toward the accumulator 22. This disconnects the accumulator 22 from the second and third passages P2, P3 and prevents flow of the hydraulic oil into the accumulator 22 when the damper 12 is locked. This stabilizes the steering of the forklift 1.

The accumulator 22 constantly replenishes the damper 12 with oil when the damper 12 is unlocked. Thus, the locking effect of the damper 12 is maintained regardless of oil leakage.

The shutoff valve 13 is normally closed by the spring 17. Thus, when the shutoff valve 13 is de-excited, the first passage P1 is disconnected from the third passage P3. This keeps the rear axle 11 locked to the body frame 1a and facilitates maintenance of the forklift 1 such as when the electrical system of the forklift 1 requires maintenance. If the forklift 1 must be moved for maintenance, a locked damper 12 may cause difficulties. In such case, the valve bypass P4 is opened manually by the manual valve 21 to unlock the damper 12. This allows the forklift 1 to be driven in a normal state.

The advantages of the first embodiment are described below.

(1) When the damper 12 is unlocked, the gas chamber 25 in the accumulator 22 increases the pressure of the reservoir chamber 23 to a predetermined value. Thus, the ball 19b of the shuttle valve 19 normally closes the orifice located closer to the damper side of the switching space 19a. In this state, the accumulator 22 replenishes the second and third passages P2, P3 with hydraulic oil through the throttle 27 if there has been leakage of oil from the damper 12. Thus, the first and second oil chambers R1, R2 and the passages P1, P2, P3 are constantly filled with an appropriate amount of hydraulic oil. Accordingly, the locking effect of the damper 12 is maintained.

(2) When a temperature increase expands the volume of the hydraulic oil, the expanded volume of oil flows into the reservoir chamber 23 of the accumulator 22 through the throttle 27. Thus, volume expansion of the hydraulic oil is absorbed without gases being mixed into the oil. Accordingly, the locking effect of the damper 12 is maintained regardless of thermal expansion of the hydraulic oil.

(3) If load is applied to the damper 12 when it is locked, the pressure in the passages P1, P2, P3 increases and moves the ball 19b of the shuttle valve 19 toward the orifice on the accumulator side of the space 19a from the opposite orifice. This disconnects the accumulator 22 from the second and third passages P2, P3 and prevents flow of oil into the accumulator 22.

(4) The passages P1, P2, P3 extend through the housing 12a of the damper 12. In addition, the shutoff valve 13, the shuttle valve 19, and the accumulator 22 are assembled integrally with the housing 12a. Accordingly, additional support members are not necessary to support the valves 13, 19 and the accumulator 22. The valves 13, 19 and the accumulator 22 would require support members if they were separate from the damper 12. This decreases assembly procedures and reduces production costs of the forklift 1.

(5) The damper 12 is a multi-movement type cylinder. If single movement dampers were used, the forklift would require two dampers arranged between the body frame 1a and the rear axle 11. Therefore, the employment of the multi-movement damper 12 eliminates the need for the second damper. Accordingly, the number of assembly procedures are decreased and the production costs of the forklift 1 are reduced.

A second embodiment according to the present invention will now be described with reference to FIG. 6.

Figure 6:
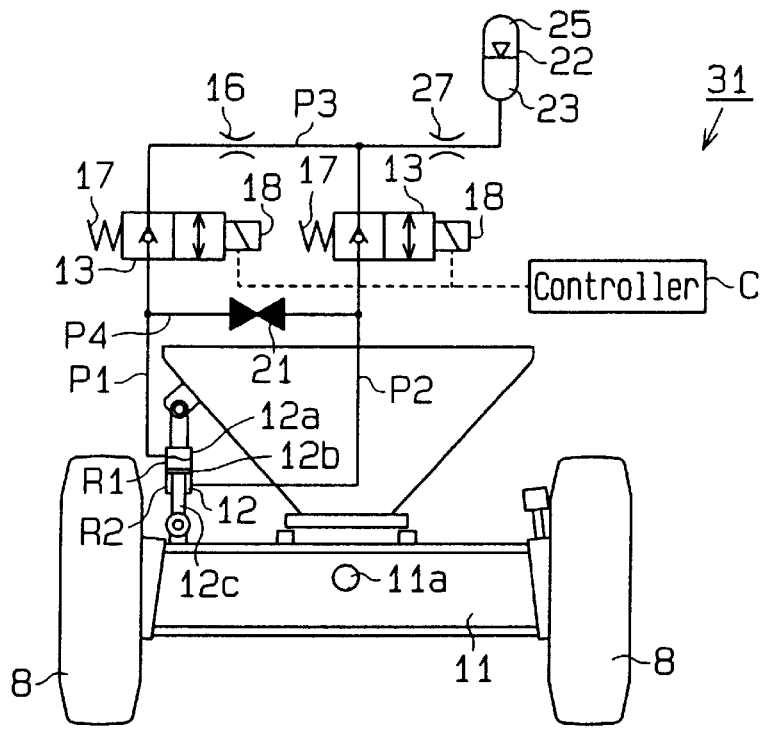
FIG. 6 is a diagrammatic view showing a second embodiment of a rear axle controller according to the present invention.

FIG. 6 is a diagrammatic view showing an axle controller according to the present invention for locking the rear axle 11. Like or identical components corresponding with the first embodiment are denoted with the same reference numerals. The second embodiment is applied to a forklift 31, which differs from the forklift 1 of the first embodiment in that the second passage P2 includes an additional shutoff valve 13, in that the shuttle valve 19 is eliminated, and in that the throttle 27 is arranged at the junction between the reservoir chamber 23 and the second and third passages P2, P3.

When the forklift 31 stops operation, the electromagnetic solenoid 18 of each shutoff valve 13 is de-excited. Thus, the force of each spring 17 closes the associated shutoff valve 13 and disconnects the third passage P3 from the first and second passages P1, P2.

Each electromagnetic solenoid 18 is excited when the forklift 31 is traveling. This connects the third passage P3 to the first and second passages P1, P2. Thus, the damper 12 is unlocked and tilting of the rear axle 11 with respect to the body frame 1a is permitted. In this state, forces applied to the rear wheels 8a, 8b are dampened by the damper 12 to stabilize the traveling forklift 31.

In the accumulator 22, the gas chamber 25 increases the pressure in the reservoir chamber 23 to a predetermined value. Thus, the accumulator 22 replenishes the second and third passages P2, P3 with hydraulic oil if there has been leakage of oil from the damper 12. Thus, the first and second oil chambers R1, R2 and the passages P1, P2, P3 are constantly filled with an appropriate amount of hydraulic oil.

When a temperature increase expands the volume of the hydraulic oil, the expanded volume of the oil flows into the reservoir chamber 23 of the accumulator 22 through the throttle 27. Thus, expansion of the hydraulic oil is absorbed without degrading the locking effect of the damper 12.

If excessive centrifugal force acts on the forklift 31, the controller C de-excites the solenoid 18 of each shutoff valve 13. This disconnects the damper 12 from the accumulator 22 and prevents flow of hydraulic oil toward the accumulator 22. Therefore, the damper 12 locks the rear axle 11 to the body frame 11 and stabilizes steering when the forklift 31 changes directions.

If the amount of hydraulic oil in the damper 12 decreases, the accumulator 22 constantly replenishes the damper 12 with oil when the damper 12 is unlocked. Accordingly, the locking effect of the damper 12 is maintained.

The advantages obtained in the second embodiment are described below.

(1) When the damper 12 is unlocked, the gas chamber 25 in the accumulator 22 increases the pressure of the reservoir chamber 23 to a predetermined value. Thus, if oil has leaked from the damper 12, the accumulator 22 replenishes the second and third passages P2, P3 with hydraulic oil through the throttle 27. Accordingly, the first and second oil chambers R1, R2 and the passages P1, P2, P3 are constantly filled with an appropriate amount of hydraulic oil. As a result, the damper 12 continues to lock properly.

(2) When a temperature increase expands the volume of the hydraulic oil, the expanded volume of the oil flows into the reservoir chamber 23 of the accumulator 22 through the throttle 27. Thus, volume expansion of the hydraulic oil is absorbed. Accordingly, the damper remains unaffected regardless of the occurrence of hydraulic oil expansion.

(3) When the damper 12 is locked, each shutoff valve 13 disconnects the damper 12 from the accumulator 22. Therefore, flow of hydraulic oil directed toward the accumulator 22 is prevented. This securely locks the damper 12.

(4) In the second embodiment, the shuttle valve 19 is eliminated and two identical shutoff valves 13 are employed. Employment of two identical components instead of two different components reduces costs.

In the first embodiment, the shuttle valve 19 and the throttle 27 may be replaced by other components, such as check valves, as long as flow of oil from the damper 12 to the accumulator 22 is prevented when the damper 12 is locked.

In the first embodiment, the passages P1, P2, P3 are formed in the housing 12a of the damper 12. Additionally, the shutoff valve 13, the shuttle valve 19, and the accumulator 22 are assembled integrally with the housing 12a. However, the passages P1, P2, P3, the valves 13, 19, and the accumulator 22 may be arranged on the body frame 1a separately from the damper 12.

As shown in FIG. 6, one of the shutoff valves 13 is arranged in the second passage P2, while the throttle 27 is arranged between the reservoir chamber 23 of the accumulator 22 and the junction of the second and third passages P2, P3. However, one of the shutoff valves 13 may be located between the reservoir chamber 23 and the junction of the second and third passages P2, P3.

Figure 7:
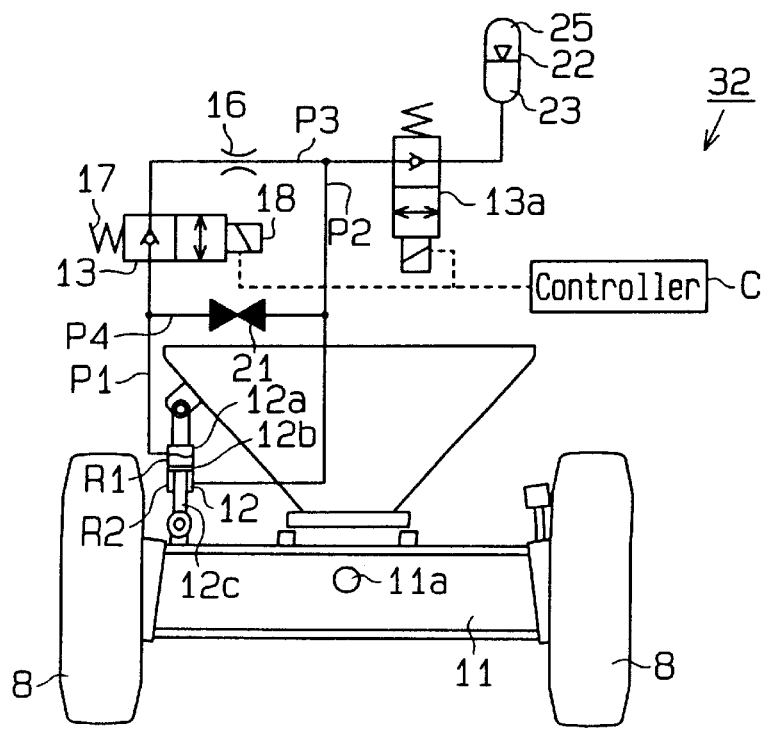
FIG. 7 is a diagrammatic view showing a further embodiment of a rear axle controller according to the present invention.

FIG. 7 is a diagrammatic view of a forklift 32 in which a further embodiment according to the present invention is employed. A compact shutoff valve 13a having a small passage, which corresponds to the throttle 27 of the second embodiment, is arranged between the reservoir chamber 23 and the junction of the second and third passages P2, P3. The compact shutoff valve 13a includes the functions of the throttle 27 and prevents large hydraulic pressure fluctuations from acting on the accumulator 22 when loads are applied to the damper 12. This structure eliminates the need for the throttle 27. Since the shutoff valve 13a is more compact than the shutoff valve 13 employed in the second embodiment, the required space is smaller.

In the embodiments illustrated in FIGS. 1 to 7, the damper 12 is a multi-movement type damper. However, a single-movement type damper or a multi-stage type damper may be employed instead.

Figure 8:
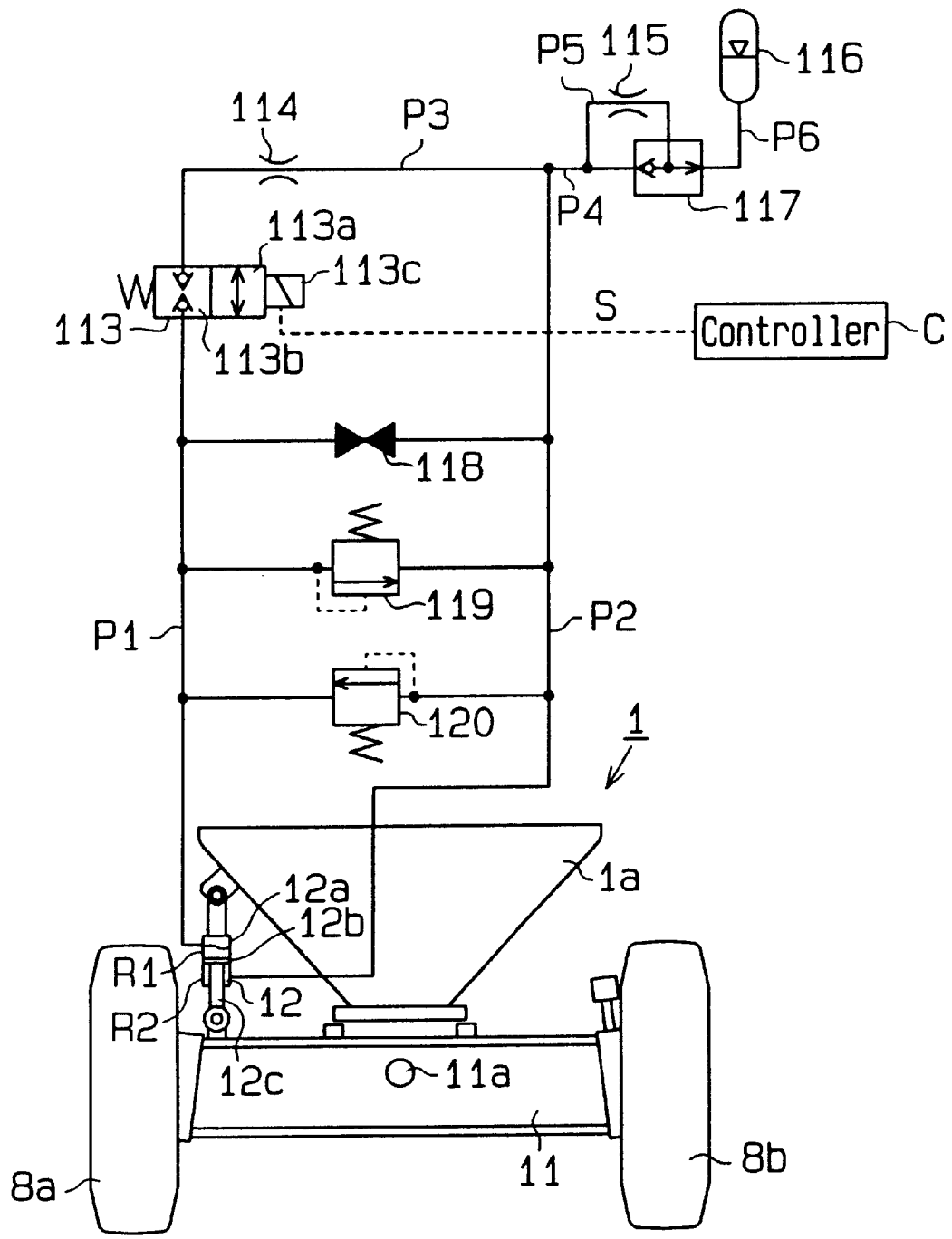
FIG. 8 is a diagrammatic view showing a further embodiment of a rear axle controller according to the present invention.

A further embodiment according to the present invention will now be described with reference to FIGS. 8 and 9. As shown in FIG. 8, a damper 12 includes a first oil chamber R1 and a second oil chamber R2. A first passage P1 is connected to the first oil chamber R1, while a second passage P2 is connected to the second oil chamber R2. The first passage P1 is connected to a third passage P3 by means of a shutoff valve 113. A throttle passage 114 is arranged in the third passage P3 to throttle the flow rate of hydraulic oil. The shutoff valve 113 is a two-way valve that includes a spool, which is shifted between a first position 113a and a second position 113b, by an electromagnetic solenoid 113c. The spool connects the first passage P1 to the third passage P3 when located at the first position 113a and disconnects the first passage P1 from the third passage P3 when located at the second position 113b. A controller C excites and de-excites the solenoid 113c to move the spool between the first and second positions 113a, 113b.

The second and third passages P2, P3 are connected to a fourth passage P4. The fourth passage P4 is further connected to a fifth passage P5, which includes a throttle passage 115 for throttling the flow rate of hydraulic oil.

The fourth and fifth passages P4, P5 are connected to a shuttle valve 117. The shuttle valve 117 is connected to an accumulator 116 by a sixth passage P6. Hydraulic oil having a predetermined pressure value is stored in the accumulator 116. Among the fourth and sixth passages P4, P6, the shuttle valve 117 closes the passage having the lower pressure. The passage having the higher pressure is connected with the fifth passage P5. In other words, the accumulator 116 and the shuttle valve 117 permit hydraulic oil to be supplied to the oil circuit from the accumulator 116 through the sixth passage P6 only when the hydraulic pressure in the first and second chambers R1, R2 and the first to fifth passages P1–P5 is smaller than the hydraulic pressure in the accumulator 116.

The first passage P1 is connected to the second passage P2 by way of a manual valve 118. The manual valve 118 is manipulated from outside to connect and disconnect the first and second passage P1, P2. The first and second passages P1, P2 are normally disconnected.

The first passage P1 is also connected to the second passage P2 by way of a first relief valve 119. If the pressure in the first passage P1 reaches a predetermined pressure value (relief pressure X), the first relief valve 119 connects the first and second passages P1, P2 to permit the flow of hydraulic oil into the second passage P2 from the first passage P1.

The second passage P2 is connected to the first passage P1 by way of a second relief valve 120. If the pressure in the second passage P2 reaches a predetermined pressure value (relief pressure X), the second relief valve 120 connects the first and second passages P1, P2 to permit the flow of hydraulic oil into the first passage P1 from the second passage P2. The manual valve 118, the first relief valve 119, and the second relief valve 120 are connected in parallel.

Figure 9:
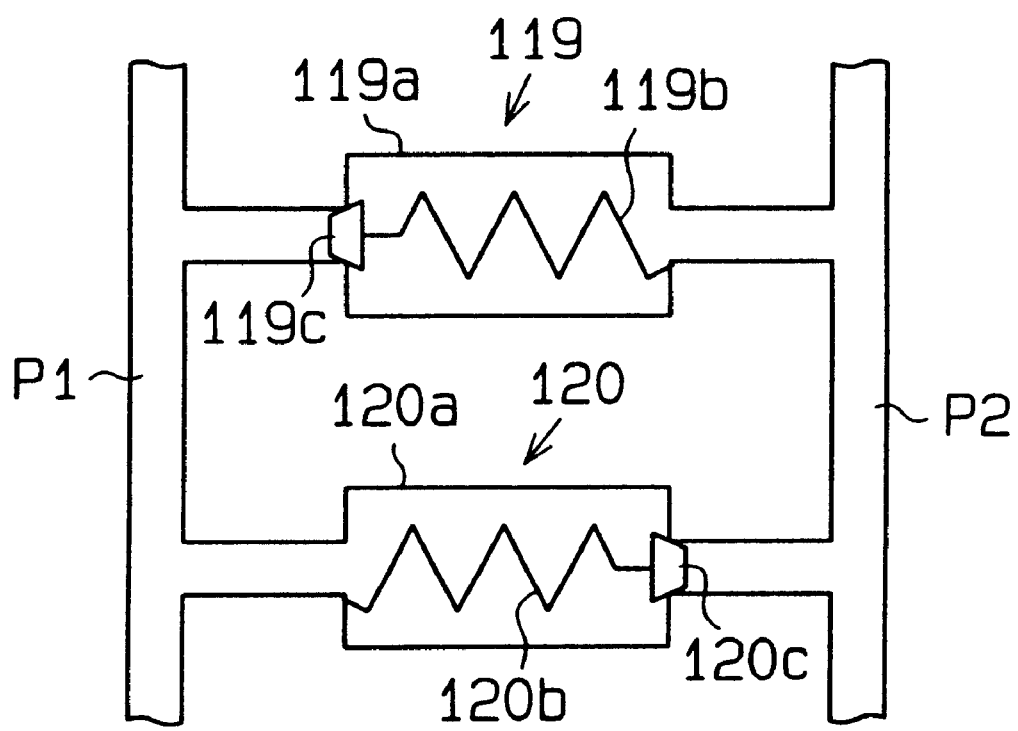
FIG. 9 is a schematic view showing a relief valve.

As shown in FIG. 9, the first relief valve 119 includes a valve housing 119a, a spring 119b, and a poppet 119c. The second relief valve 120 also includes a valve housing 120a, a spring 120b, and a poppet 120c. The relief pressure X is determined based on the strength of the springs 119b, 120b and the forms of the poppets 119c, 120c.

When the operation of the forklift 1 is stopped, the electromagnetic solenoid 113c of the shutoff valve 113 is de-excited. Thus, the spool of the shutoff valve 113 is located at the second position 113b and the first passage P1 is disconnected from the third passage P3.

When the forklift 1 is being operated, the solenoid 113c is excited to shift the spool of the shutoff valve 113 to the first position 113a. This connects the first passage P1 to the third passage P3 and switches the damper 12 to an unlocked state. In the unlocked state, the damper 12 permits the rear axle 11 to be tilted with respect to the body frame 1a to absorb the forces applied to the rear wheels 8a, 8b. This stabilizes the traveling forklift 1.

If excessive centrifugal force is applied to the forklift 1 when the damper 12 is unlocked, especially, when the forklift 1 is carrying a heavy object at a high position, stable steering of the forklift 1 becomes difficult. In such case, the damper 12 must be locked. Therefore, the controller C de-excites the solenoid 113c of the shutoff valve 113 and disconnects the first passage P1 from the third passage P3.

When the forklift 1 is steered to change directions, the hydraulic pressure in one of the first and second oil chambers R1, R2 becomes higher than that of the other chamber depending on factors such as the direction in which the forklift 1 turns, bumps on the road, and the weight of the carried object. The relief pressure X of the first and second valves 119, 120 is determined in accordance with the maximum hydraulic pressure that is applied to any one of the first and second oil chambers R1, R2 under normal traveling conditions, or the maximum pressure Y. For example, the relief pressure X may be set at a value that is greater than that of the maximum pressure Y.

The relief pressure X is also determined in accordance with the maximum capacity pressure of the damper 12, or maximum capacity pressure Z. For example, the relief pressure X may be set at a value that is smaller than that of the maximum capacity pressure Z. Accordingly, the maximum pressure Y is smaller than the relief pressure X, which is smaller than the maximum capacity pressure Z.

If the left rear wheel 8a first contacts the ground when the forklift 1 is lowered from a truck with the damper 12 in a locked state, the load applied to the rear wheel 8a may compress the damper 12. In this case, the pressure in the first oil chamber R1 increases suddenly. However, if the value of the pressure in the first oil chamber R1 reaches the relief pressure X, the first relief valve 119 relieves the pressure by permitting the flow of hydraulic oil from the first passage P1 to the second passage P2. This prevents the hydraulic pressure in the first oil chamber R1 from becoming greater than the maximum capacity pressure Z of the damper 12. Thus, damage to the damper 12 is prevented.

If the right rear wheel 8b first contacts the ground when the forklift 1 is lowered from a truck with the damper 12 in a locked state, the load applied to the rear wheel 8a may extend the damper 12. In this case, the pressure in the second oil chamber R2 increases suddenly. However, if the value of the pressure in the second oil chamber R2 reaches the relief pressure X, the second relief valve 120 relieves the pressure by permitting the flow of hydraulic oil from the second passage P2 to the first passage P1. This prevents the hydraulic pressure in the second oil chamber R2 from becoming greater than the maximum capacity pressure Z of the damper 12. Thus, damage to the damper 12 is prevented.

Accordingly, the first and second relief valves 119, 120 permit the flow of hydraulic oil between the first and second passages P1, P2 when excessive load is applied to one of the rear wheels 8a, 8b. Thus, the relief valves 119, 120 unlocks the damper 12 to prevent the pressure in the damper 12 from becoming excessive.

The relief pressure X is set at a value within a range between the pressure in the relief valves 119, 120 when oil starts to flow therein, or the cracking pressure Xa, and the pressure in the relief valves 119, 120 when the oil flowing therethrough reaches the maximum flow rate, or the maximum flow pressure Xb. The cracking pressure Xa is greater than the maximum pressure Y for normal traveling conditions. The maximum flow pressure Xb is smaller than the maximum capacity pressure Z of the damper 12. The maximum flow rate of the oil that flows through the relief valves 119, 120 is determined so that the pressure in the first and second oil chambers R1, R2 never exceeds the maximum flow pressure Xb. Accordingly, the relationship of Y<Xa<X<Xb<Z is satisfied.

The advantages obtained in the embodiment illustrated in FIGS. 8 and 9 will be described below.

(1) The relief pressure X of the first and second relief valves 119, 120 in the hydraulic circuit is set at a value that is greater than the maximum pressure Y for normal traveling conditions and smaller than the maximum capacity pressure Z of the damper 12.

When the rear axle 11 is fixed to the body frame 1a during sudden turning of the forklift 1, the first and second passages P1, P2 are disconnected by the first and second relief valves 119, 120 to maintain the damper 12 in a locked state. This stabilizes the traveling forklift 1.

The forklift 1 may be unloaded from a truck during transportation. In such cases, if the pressure in the damper 12 becomes great when one of the rear wheels 8a, 8b contacts the ground before the other, the first and second valves 119, 120 permit hydraulic oil to flow from the passage P1, P2 having a higher pressure to the passage P1, P2 having a lower pressure. Thus, the damper 12 is unlocked and the pressure in the damper 12 is decreased to prevent the pressure from exceeding the capacity pressure of the damper 12. Accordingly, damage to the damper 12 is prevented.

(2) The maximum capacity pressure Z of the damper 12 is determined based on the relief pressure X. If the relief pressure X is set at a value that guarantees locking of the damper 12 when the forklift 1 is being operated under normal conditions and is a value close to the maximum pressure Y for normal traveling conditions, the maximum capacity pressure Z may be set at a value that is close to the maximum pressure Y. This enables the damper 12 to have a pressure capacity that is lower than conventional dampers. Thus, the damper 12 may employ a cylinder having a thinner wall. Accordingly, production costs may be decreased. Furthermore, the diameter of the cylinder may be decreased. This enables the damper 12 to be installed in a smaller space and facilitates the lay out of the damper 12 and its peripheral components.

(3) The first and second relief valves 119, 120 are connected between the first and second passages P1, P2 in opposite directions. Therefore, when the pressure in one of the passages P1, P2 reaches the relief pressure X, hydraulic oil flows from the passage having a higher pressure to the passage having a lower pressure. Thus, when only one of the rear wheels 8a, 8b abuts against the ground with the damper 12 in a locked state, the first and second relief valves 119, 120 unlock the damper 12 to relieve high hydraulic pressure in the hydraulic circuit. In a structure that arranges a relief valve in each of the first and second passages P1, P2 and delivers excessive oil into a reserve tank, a provision for returning the oil is necessary. However, the structure of the embodiment illustrated in FIGS. 8 and 9 eliminates the need for such a provision.

(4) The first and second relief valves 119, 120 are constituted only by the valve housings 119a, 120a, the springs 119b, 120b, and the poppets 119c, 120c, respectively. Thus, the structure of the valves 119, 120 is simple and thus decreases the production cost of the damper 12.

(5) When the pressure in the first and second oil passages R1, R2 and the first to fifth passages P1–P5 becomes smaller that the pressure in the accumulator 116, the accumulator 116 and the shuttle valve 117 deliver hydraulic oil to the hydraulic circuit through the fifth passage P5. Thus, the hydraulic circuit is always filled with an appropriate amount of hydraulic oil even if there has been leakage of oil. Accordingly, the locking effect of the damper 12 is maintained. Furthermore, when the application of a load increases the pressure in the hydraulic circuit, the shuttle valve 117 becomes disconnected from the sixth passage P6. Thus, hydraulic oil does not enter the accumulator 116.

Figure 10:
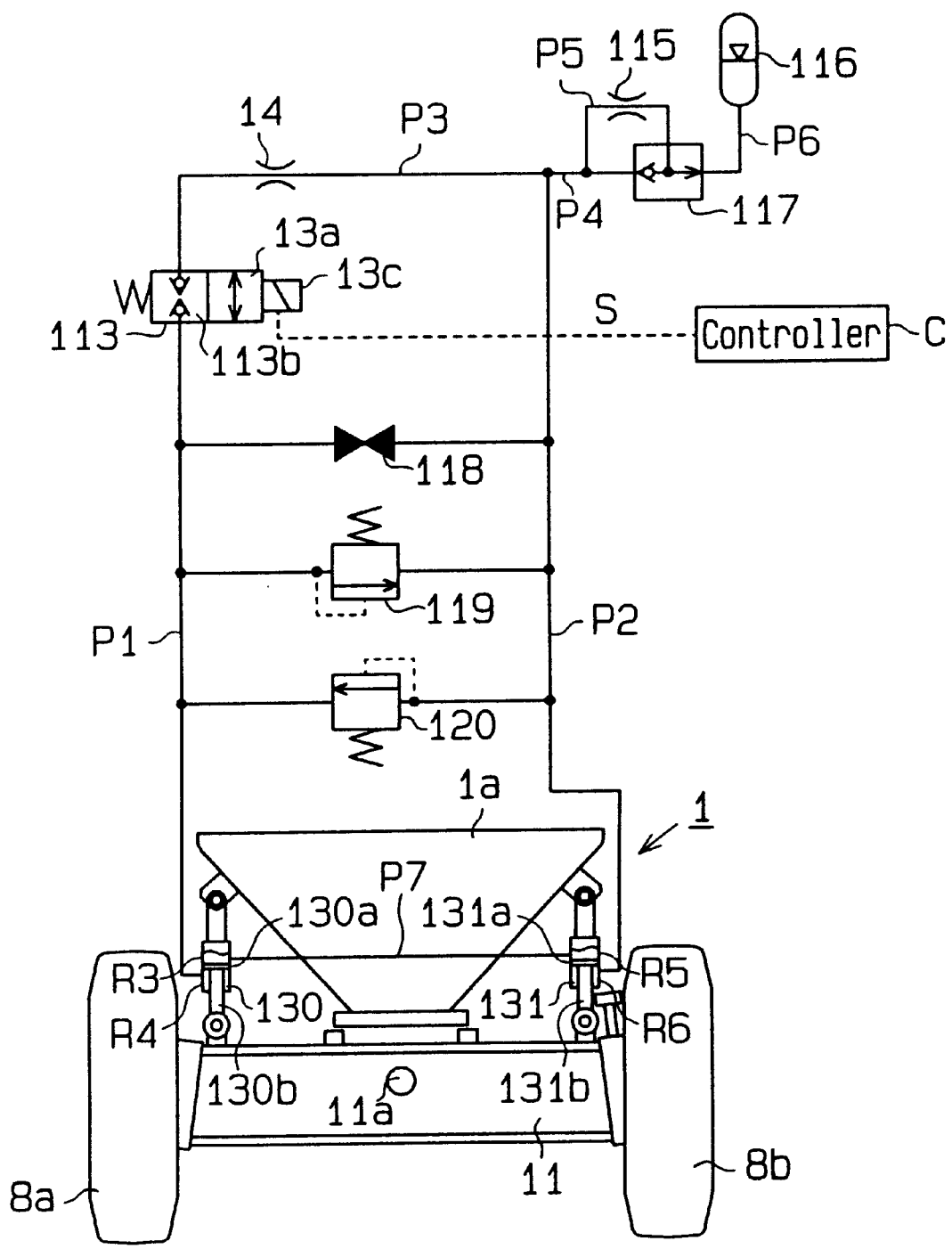
FIG. 10 is a diagrammatic view showing a further embodiment of a rear axle controller according to the present invention.

In a further embodiment according to the present invention, two dampers 130, 131 may be employed to connect the rear axle 11 to the body frame 1a, as shown in FIG. 10. Components that are like or identical to those corresponding to the embodiment illustrated in FIGS. 8 and 9 are denoted with the same reference numerals. The damper 130 is associated with the rear wheel 8a, while the damper 131 is associated with the rear wheel 8b.

In the damper 130, a piston 130 defines an oil chamber R3 and an oil chamber R4. A piston rod 130b extends through the oil chamber R4 from the piston 130. In the damper 130, a piston 131 defines an oil chamber R5 and an oil chamber R6. A piston rod 131b extends through the sixth oil chamber R6 from the piston 131. The oil chamber R3 is connected to the oil chamber R5 by a seventh passage P7. The oil chamber R4 is connected with the first passage P1. The oil chamber R6 is connected with the second passage P2. This structure has the same advantages as the preferred embodiment illustrated in FIGS. 8 and 9.

In the embodiments illustrated in FIGS. 8 to 9, the first and second relief valves 119, 120 may be any kind of valve as long as the flow of the hydraulic oil is controlled in accordance with the hydraulic pressure.

In the embodiments shown in FIGS. 8 to 10, the first and second relief valves 119, 120 are separated from each other and connected in parallel. However, the valves 119, 120 may be formed integrally to relieve pressure in two directions.

A relief valve may be arranged in each of the first and second passages P1, P2. If the pressure in each passage P1, P2 exceeds the relief pressure X, hydraulic oil may be released into a reserve tank. In this case, the accumulator 116 replenishes the hydraulic circuit to compensate for the released oil.

The embodiments illustrated in FIGS. 8 to 10 employ the shuttle valve 117 and the throttle passage 115. However, these elements 115, 117 may be replaced by other types of components, such as check valves, as long as hydraulic oil flow from the damper 12, 130, 131 toward the accumulator 116 is prevented.

In the embodiments illustrated in FIGS. 8 to 10, the shutoff valve 113 is normally closed. That is, the shutoff valve 113 is closed when de-excited. However, a shutoff valve that is normally opened may be employed instead.

In the embodiments illustrated in FIGS. 8 to 10, the damper 12 is a multi-movement type damper. However, a single-movement type damper or a multi-stage type damper may be employed instead. Furthermore, the application of the present invention is not limited to forklifts and may be employed in other types of industrial vehicles.

A further embodiment according to the present invention will now be described with reference to FIGS. 11 and 12.

In this embodiment, the damper 12 has a first oil chamber R1, which is connected to a first accumulator 214 by way of a first passage P1, a first poppet valve 213, and a second passage P2. A first throttle passage 215 is arranged in the second passage P2 to regulate the flow of the hydraulic oil in the passage P2. The damper 12 also has a second oil chamber R2, which is connected to a second accumulator 214 by way of a third passage P3, a second poppet valve 213, and a fourth passage P4. A second throttle passage 215 is arranged in the fourth passage P4 to regulate the flow of the hydraulic oil in the passage P4.

A bypass P5 connects the first and third passages P1, P3 with each other. A manual valve 216 is arranged in the bypass P5 to manually open and close the bypass P5. The bypass P5 is normally closed by the manual valve 216.

Figure 11:
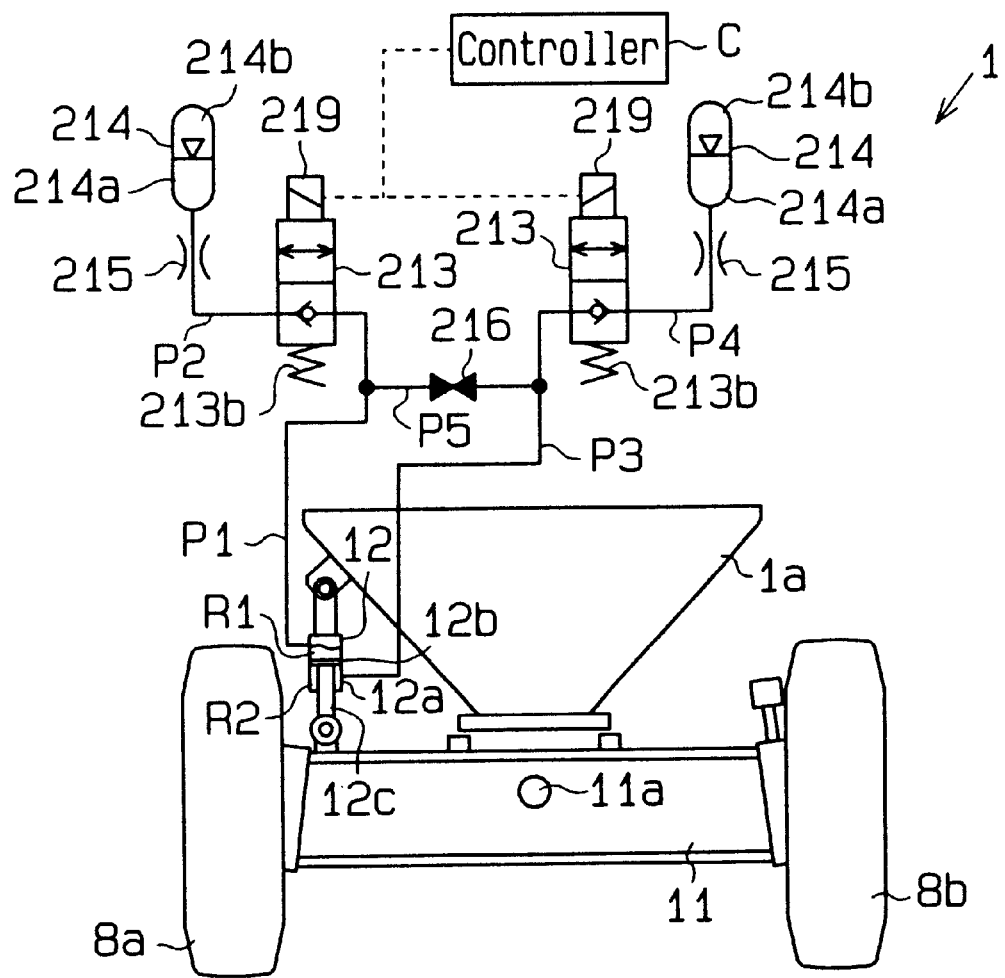
FIG. 11 is a diagrammatic view showing a further embodiment of a rear axle controller according to the present invention.
Figure 12:
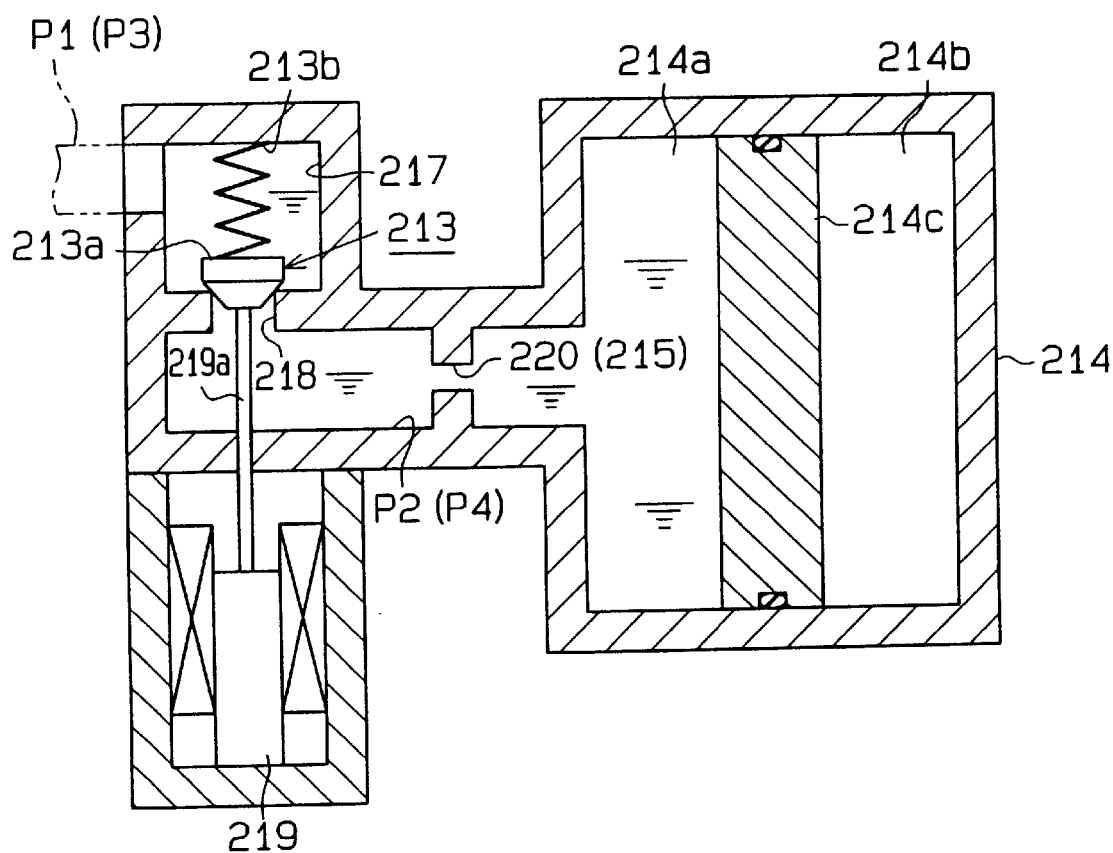
FIG. 12 is a schematic cross-sectional view showing an accumulator and a poppet valve.

FIG. 12 is a schematic cross-sectional view showing an example of the poppet valve 213 and the accumulator 214. Each poppet valve 213 has a communication chamber 217 that is connected to the first passage P1 (or third passage P3). The communication chamber 217 is also connected to the second passage P2 (or fourth passage P4) through a port 218. A valve body 213a urged by the force of a spring 213b closes the communication chamber side of the port 218. An electromagnetic solenoid 219 is aligned axially with the spring 213b. A plunger 219a extending from the solenoid 219 is coupled to the valve body 213a. Excitation and de-excitation of the electromagnetic solenoid 219 moves the valve body 213a. As shown in FIG. 11, a controller C is connected to the solenoid 219 to excite and de-excite the solenoid 219.

When the forklift 1 is operated, the solenoid 219 is excited. This extends the plunger 219a and moves the valve body 213 against the force of the spring 213b. Thus, the first passage P1 (third passage P3) is connected to the second passage P2 (fourth passage P4) through the communication chamber 217 and the associated damper 12 is switched to an unlocked state. When the controller C outputs a signal for locking the rear axle 11 to the body frame 1a, the solenoid 219 is de-excited. This moves the valve body 213a with the force of the spring 213b and disconnects the first passage P1 (third passage P3) from the second passage P2 (fourth passage P4). Accordingly, the damper 12 is locked.

The second passage P2 (fourth passage P4) includes an orifice 220, the diameter of which is smaller than that of the second passage P2. The orifice 220 functions as throttle passage 215, which regulates the flow of the hydraulic oil. The second passage P2 (fourth passage P4) is connected to a reservoir chamber 214a of the accumulator 214. Hydraulic oil is stored in the reservoir chamber 214a. The accumulator 214 further has a gas chamber 214b, in which pressurized gas is contained. The gas chamber 214b and the reservoir chamber 214a are partitioned by a piston 214c. The hydraulic oil contained in the reservoir chamber 214a is pressurized within a predetermined pressure range. Thus, the hydraulic pressure of the reservoir chamber 214a pushes the valve body 213a and opens the port 218 if the pressure in the damper 12 decreases due to oil leakage. This replenishes the damper 12 with hydraulic oil from the reservoir chamber 214a.

When the operation of the forklift 1 is stopped, the electromagnetic solenoid 219 of each poppet valve 213 is de-excited. This moves the valve body 213a away from the associated port 218. Thus, the first passage P1 is disconnected from the second passage P2 and the third passage P3 is disconnected from the fourth passage P4.

During operation of the forklift 1, the solenoid 219 of each poppet valve 213 is excited. Thus, the first passage P1 is connected with the second passage P2 and the third passage P3 is connected with the fourth passage P4. Accordingly, the damper 12 is unlocked and the rear axle 11 becomes tiltable with respect to the body frame 1a. In this state, forces applied to the rear wheels 8a, 8b are absorbed by the damper 12. The gas chamber 214b in each accumulator 214 also functions as a damper. Thus, the forklift 1 travels in a stable manner.

The hydraulic oil that replenishes the first and second oil chambers R1, R2 and the passages P1–P4 is pressurized by the gas chamber 214b of each accumulator 214. This increases the rigidity of the damper 12 and enhances the roll stiffness of the forklift 1. Therefore, components for enhancing the roll stiffness of the forklift 1, such as coil springs, are not necessary. This decrease the number of components used in the forklift 1.

When excessive centrifugal force is applied to the forklift 1, the controller C de-excites the solenoid 219 of each poppet valve 213 to lock the damper 12. This causes each poppet valve 213 to disconnect the accumulator 214 from the associated damper 12 and prevent flow of hydraulic oil into the accumulator 214. Accordingly, the damper 12 is locked and the rear axle 11 is locked to the body frame 1a. Thus, the steering of the forklift 1 is stabilized.

The poppet valves 213 are normally closed to disconnect the damper 12 from the associated accumulator 214. This keeps the rear axle 11 locked to the body frame 1a when a malfunction occurs in the electrical system. Thus, the forklift 1 is stabilized when changing directions. However, if the forklift 1 must be moved for maintenance, a locked damper 12 may cause difficulties when there are bumps on the road. In such case, the bypass P5 is opened manually by the manual valve 216 to unlock the damper 12. This allows the forklift 1 to be driven in a normal state.

The advantages obtained in the embodiment illustrated in FIGS. 11 and 12 will be described below.

(1) The first oil chamber R1 of the damper 12 is connected to the accumulator 214 through the first passage P1, the poppet valve 213, and the second passage P2. The second oil chamber R2 is connected to the third passage P3, the poppet valve 213, and the fourth passage P4. The pressure in each reservoir chamber 214a is increased by the compressed gas in the associated gas chamber 214b. Accordingly, when the poppet valves 213 are opened, the pressurized reservoir chamber 214a replenishes the damper 12 with hydraulic oil. Thus, the damper 12 is constantly filled with an appropriate amount of oil. This prevents degradation of the locking effect of the damper 12 even when there is leakage of oil from the damper 12.

(2) When volume expansion of the hydraulic oil occurs due to a temperature increase, an amount of oil corresponding to the expansion flows into the reservoir chamber 214a through the opened poppets valves 213 and the throttle passages 215. Thus, expansion of the hydraulic oil is absorbed. Accordingly, the damper 12 is not influenced by thermal expansion of the hydraulic oil.

(3) The throttle passages 215 are arranged between the associated poppet valve 214 and accumulator 214. Therefore, the throttle passages 215 regulate the flow of the hydraulic oil between the damper 12 and the accumulators 214. This increases the rigidity of the damper 12 and enhances the roll stiffness of the forklift 1 without enlarging the accumulators 214.

(4) The damper 12 is a multi-movement hydraulic cylinder. If a single movement damper were to be employed, two dampers would be required between the body frame 1a and the rear axle 11. Thus, the employment of the multi-movement damper 12 enables the rear axle 11 to be connected to the body frame 1a by a single damper. This decreases the number of assembly procedures and decreases production costs of the forklift 1.

In the embodiment illustrated in FIGS. 11 and 12, the poppet valves 213 may be replaced by other types of valves as long as flow of hydraulic oil from the damper 12 to each accumulator 214 is prevented.

In the embodiment illustrated in FIGS. 11 and 12, pressurized gas is contained in the gas chamber 214b. However, the pressurized medium may be a liquid. Furthermore, an elastic member such as a spring may be used to press the piston 214c with a predetermined force.

In the embodiment illustrated in FIGS. 11 and 12, the damper 12 is a multi-movement type damper. However, a single-movement type damper or a multi-stage type damper may be employed instead.

A further embodiment according to the present invention will now be described with reference to FIGS. 13 and 14.

Figure 13:
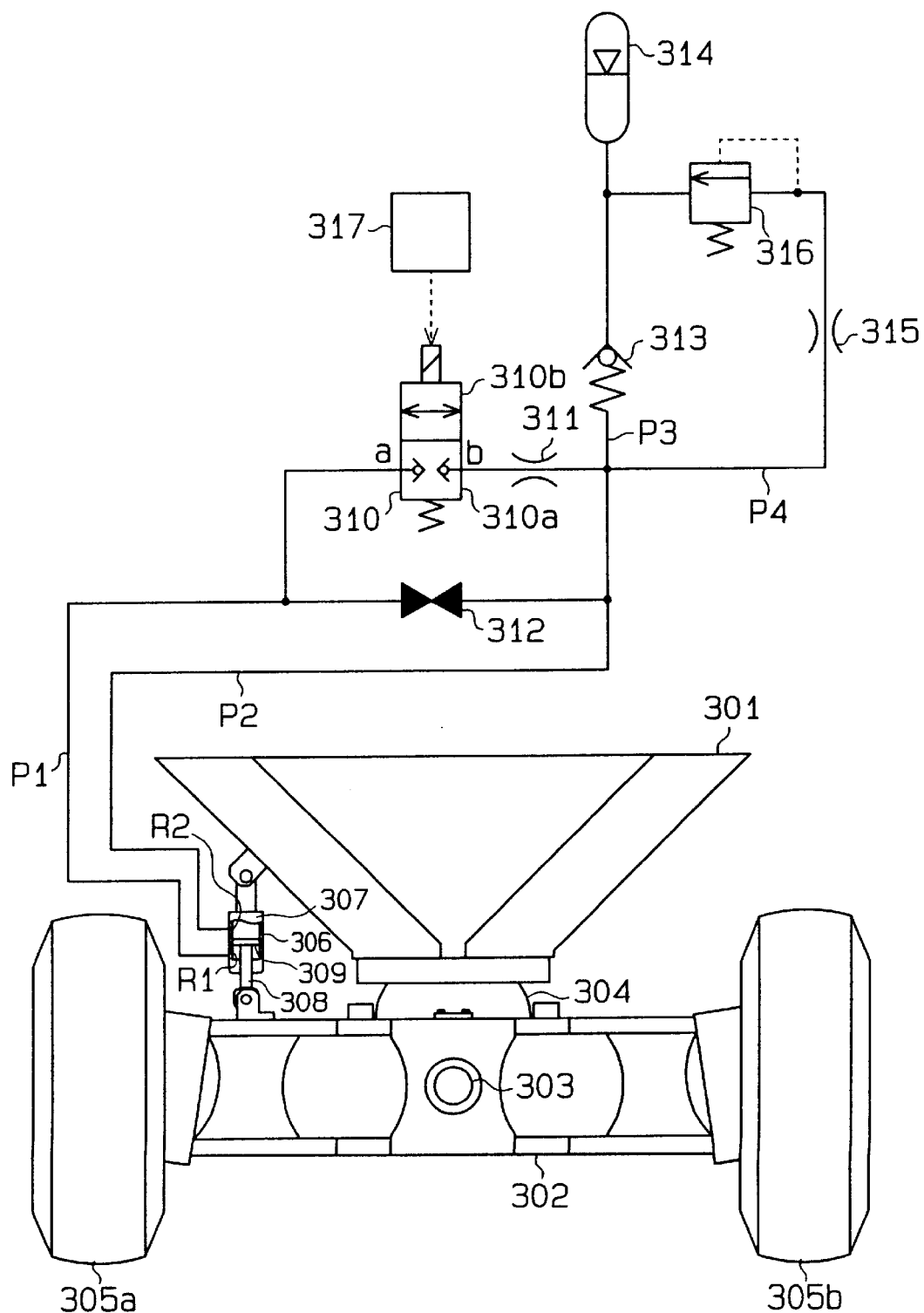
FIG. 13 is a diagrammatic view showing a further embodiment of a rear axle controller according to the present invention.

FIG. 13 is a diagrammatic view showing a further embodiment according to the present invention. A rear axle 302 is coupled to a body frame 301 by a center pin 303. The rear axle 302 is pivotally supported by the center pin 303 so that the rear axle 302 is tiltable in the vertical direction (roll direction). An elastomeric member 304, which is made of rubber or a similar material, is arranged between the body frame 301 and the rear axle 302. Rear wheels 305a, 305b are mounted on each end of the rear axle 302.

A damper includes a multi-movement hydraulic cylinder 306 located between the body frame 301 and the rear axle 302. The cylinder 306 has a housing 307, a piston 309, and a piston rod 308. The housing 307 is secured to the body frame 301. The piston rod 308, which extends from the housing 307 is secured to the rear axle 302. The piston 309, which is coupled to the piston rod 308, defines a first oil chamber R1 and a second oil chamber R2 in the housing 307. Tilting of the rear axle 302 with respect to the body frame 301 extends and retracts the cylinder rod 308. This, in turn, moves hydraulic oil in and out of the first and second oil chambers R1, R2.

The first oil chamber R1 is connected to an electromagnetic control valve 310 by a passage P1. The second oil chamber R2 is also connected to the electromagnetic control valve 310 by a passage P2. A throttle passage 311 is arranged in the passage P2.

The control valve 310 is a normally closed two-way switch valve that has two ports a, b. The control valve 310 is moved between a disconnection position 310a when de-excited and a connection position 310b when excited. At the disconnection position 310a, the control valve 310 disconnects the ports a, b. At the connection position 310b, the control valve 310 connects the ports a, b. The port a is connected with the passage P1, while the port b is connected with the passage P2. Accordingly, the control valve 310 prohibits the flow of hydraulic oil between the oil chambers R1, R2 when located at the disconnection position 310a and permits the flow of hydraulic oil between the oil chambers R1, R2 when located at the connection position 310b.

The passages P1, P2 are connected to each other by way of a manual valve 312. The manual valve 312 connects the first oil chamber R1 to the second oil chamber R2 when the control valve 310 is located at the disconnection position 310a.

The passage P2 is connected to an accumulator 314 by a passage P3. A check valve 313 is arranged in the passage P3 to prohibit reversed flow of hydraulic oil toward the accumulator 314. The accumulator 314 is also connected to the passage P2 by a passage P4. The passage P4 includes a throttle passage 315 and a relief valve 316. The throttle passage 315 regulates the flow of hydraulic oil in the passage P4 and the relief valve 316 relieves the pressure in the passage P4. The downstream side of the relief valve 316 is connected to the accumulator 314. The accumulator 314 supplies the oil chambers R1, R2 with hydraulic oil so that the pressure in the oil chambers R1, R2 is maintained above a predetermined value. The check valve 313 prevents the hydraulic oil in the passage P3 from flowing toward the accumulator 314.

The cracking pressure of the relief valve 316 is set at a value that is greater than the pressure in the oil chambers R1, R2 when the forklift lifts an object and continuously applies a load on to the cylinder 306 with the oil in the oil chambers R1, R2 in a locked state. The cracking pressure is set at a value lower than the maximum capacity pressure of the cylinder 306. The maximum capacity pressure is set at a value that is lower than the limit pressure (seal pressure) of the seals employed in the cylinder 306. The seals include O-rings (not shown) fitted on the piston 309 and lip packings (not shown) fitted on the piston rod 308.

When the forklift is steered to change directions, the cylinder 306 is locked to restrict the tilting of the rear axle 302. This applies a continuous load on the cylinder 306 and increases the pressure in the oil chambers R1, R2. The pressure in the oil chambers R1, R2 also increases if the center of gravity of an object lifted by the forklift is located away from the center of the vehicle 306 when the cylinder 306 is sustained in a locked state. As shown in FIG. 14, experiments have been conducted to confirm that the maximum lifting pressure B produced when lifting objects is higher than the maximum steering pressure produced when steering the forklift. The limit pressure C of the seals employed in the cylinder 306 is set at a value higher than the maximum pressure B. The maximum capacity pressure D of the cylinder 306 is set at a value that is higher than the limit pressure C of the seals. As shown in FIG. 14, the cracking pressure P of the relief valve 316 is set within range R, that is, between the maximum lifting pressure B and the seal limit pressure C. Accordingly, the relationships of A<B<P<C<D and C−B=R are satisfied.

When excessive pressure is produced in the oil chamber R2, the throttle passage 315 restricts the transmission of the pressure to the relief valve 310. A controller 317 is provided on the body frame 301 to control the electromagnetic control valve 310. The controller 317 commences operation when an ignition switch (not shown) is turned on and continuously excites the control valve 310 by sending electric current to the valve 310. Furthermore, the controller 317 stops the flow of current to lock the rear axle 302 to the body frame 301 when necessary.

The operation of the rear axle controller will now be described.

Under normal conditions, the manual valve 312 is closed. When the ignition switch is turned on, the controller 317 shifts the control valve 310 from the disconnection position 310a to the connection position 310b and connects the oil chamber R1 with the oil chamber R2 by way of the throttle passage 311. This unlocks the cylinder 306 and permits the rear axle 302 to tilt with respect to the body frame 301.

If the forklift is steered to the right, the controller 317 shifts the electromagnetic control valve 310 from the connection position 310b to the disconnection position 310 to lock the cylinder 306. In this state, the cylinder housing 307 is continuously urged downward by the body frame 301. This increases the pressure in the second oil chamber R2. The pressure of the second oil chamber R2 increases but is kept below the maximum steering pressure A.

When the cylinder 306 is locked during the lifting of objects, and if the center of gravity of the object is offset toward the left from the center of the forklift, the housing 307 is continuously urged downward. This increases the pressure in the second oil chamber R2. However, the pressure in the second oil chamber R2 is kept below the maximum lifting pressure B.

If the forklift travels along unpaved roads over a long period of time with the cylinder 306 in an unlocked state, the cylinder 306 is actuated repetitively. This increases the temperature of the hydraulic oil. In this state, the flow of hydraulic oil from the oil chambers R1, R2 to the accumulator 314 is impeded by the check valve 313. This further increases the temperature of the hydraulic oil. When the pressure in the oil chambers R1, R2 reaches the cracking pressure P, the relief valve 316 releases the hydraulic oil toward the accumulator 314 and prevents the pressure from exceeding the cracking pressure P. Accordingly, the pressure in the cylinder 306 does not exceed the seal limit pressure C regardless of an increase in the temperature of the hydraulic oil.

When steering the forklift to the right, if the left rear wheel 305a runs over a bump on the road when the cylinder 306 is locked, the rear axle 302 is momentarily pivoted in the clockwise direction with respect to the body frame 301. This applies a force that acts to retract the piston rod 308 into the cylinder 306 and thereby produces a large pressure in the second oil chamber R2. Since the load applied to the cylinder 306 is large momentarily, the pressure transmitted to the relief valve 316 is restricted by the throttle passage 315. Accordingly, the pressure produced in the second oil chamber R2 may exceed the cracking pressure P of the relief valve 316. However, since the load is applied momentarily, the sealing performance of the seals remains unchanged despite the pressure in the second oil chamber R2 exceeding the seal limit pressure C.

When the controller 317 malfunctions, the electromagnetic control valve 310 is de-excited. This holds the control valve 310 at the disconnection position 310a. In this state, if the manual valve 312 is opened, the oil chambers R1, R2 are communicated with one another. This permits actuation of the cylinder 306 and enables the rear axle 302 to be tilted with respect to the body frame 301.

Figure 14:
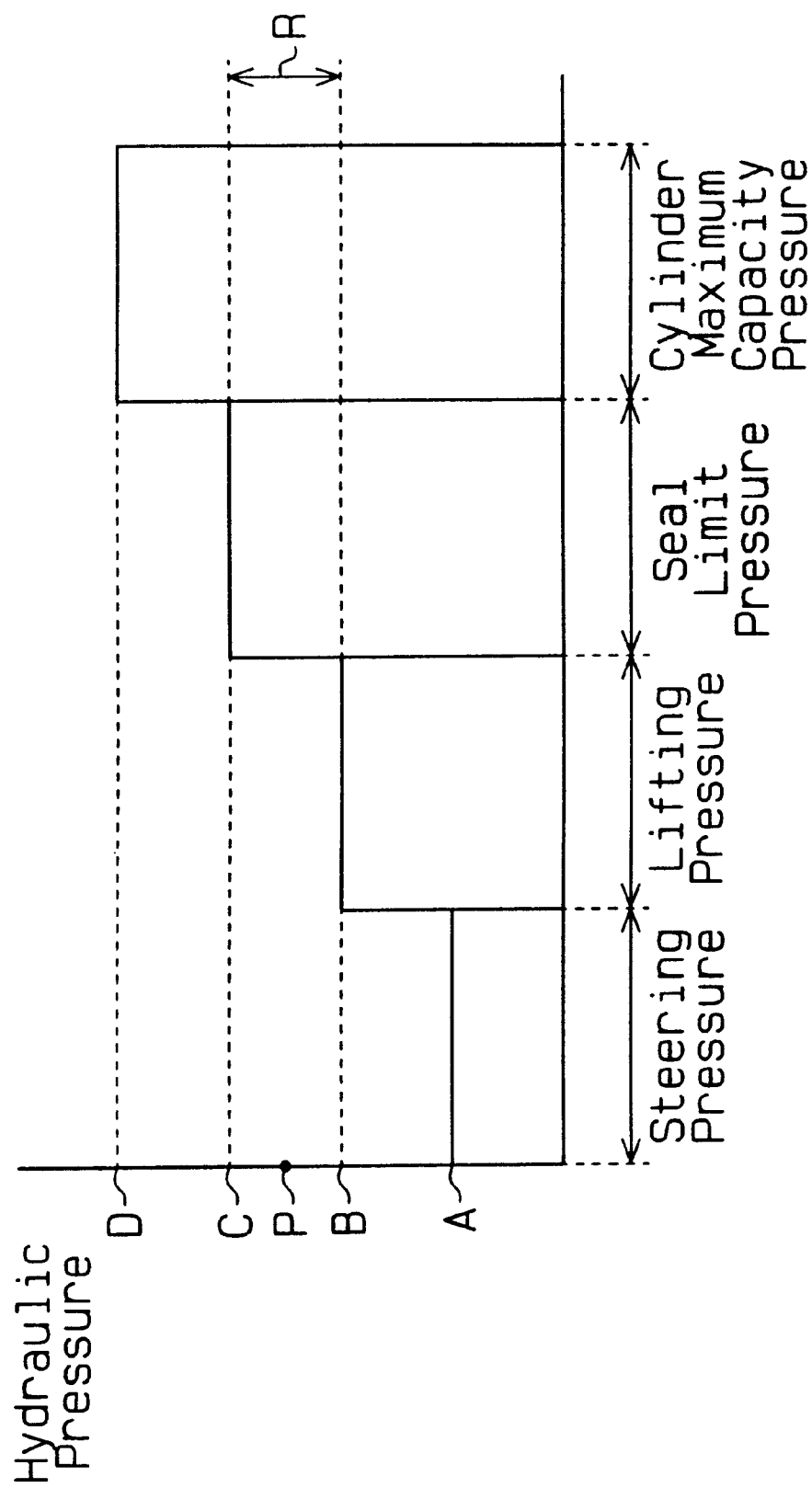
FIG. 14 is a graph illustrating the maximum pressure of the damper.

The advantages of the embodiment illustrated in FIGS. 13 and 14 are described below.

(a) Repetitive extension and retraction of the piston rod 308 in the cylinder 306 increases the temperature of the hydraulic oil. This increases the temperature of the hydraulic oil in the oil chambers R1, R2 since the flow of hydraulic oil from the oil chambers R1, R2 to the accumulator 314 is restricted. When the pressure in the oil chambers R1, R2 reaches the cracking pressure P of the relief valve 316, hydraulic oil is released through the relief valve 316 toward the accumulator 314. This prevents the hydraulic pressure from exceeding the cracking pressure P. The cracking pressure P is higher than the maximum lifting pressure B and lower than the maximum capacity pressure D. Accordingly, if load is continuously applied to the cylinder 306 when the tilting of the axle 302 is restricted, the hydraulic circuit withstands the load and prevents damage to the cylinder 306.

(b) When the application of a momentary load increases the pressure in the oil chamber R2, the transmission of the pressure to the relief valve 316 is restricted by the throttle passage 315. Although the pressure may exceed the cracking pressure P of the relief valve 316, the pressure increase in the oil chamber R2 is momentary. Thus, degradation of the sealing performance of the seals is prevented and damage to the hydraulic circuit is avoided.

(c) The cracking pressure P is set at a value that is lower than the seal limit pressure C. Thus, degradation in the sealing performance of the seals due to an increase in the temperature of the hydraulic oil is prevented.

(d) The relief valve 316 restricts the pressure in the oil chambers R1, R2 from exceeding the cracking pressure P. Furthermore, the throttle passage 315 regulates the pressure of the oil chambers R1, R2 that is transmitted to the relief valve 316. Since the throttle passage 315 and the relief valve 316 are formed integrally, the structure of this embodiment is simplified.

(e) The electromagnetic control valve 310 is normally closed. Thus, the control valve 310 is located at the disconnection position 310a when the controller 317 malfunctions, which locks the cylinder 306. Accordingly, tilting of the rear axle 302 is restricted. Thus, maintenance may be carried out on the controller 317 after the forklift completes the transportation of an object in a stable traveling state.

Figure 15:
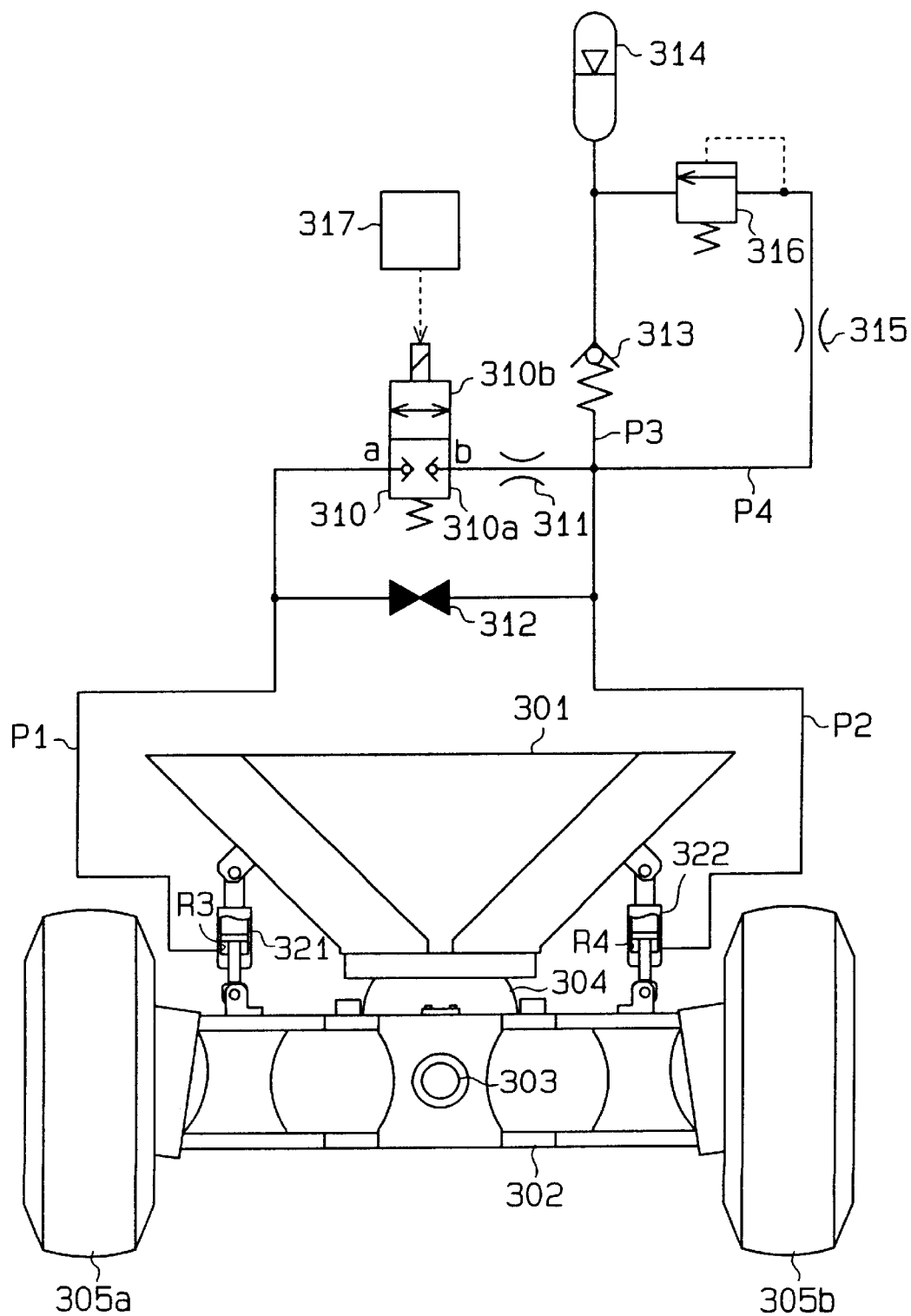
FIG. 15 is a diagrammatic view showing a further embodiment of a rear axle controller according to the present invention.

In the embodiment described in FIGS. 13 and 14, a single multi-movement cylinder 306 is employed. However, as shown in FIG. 15, two multi-movement hydraulic cylinders 321, 322 may be used instead. In this case, the port a of the electromagnetic control valve 310 is connected to oil chamber R3 of the cylinder 321, while the port b of the control valve 310 is connected to the oil chamber R4 of the other cylinder 322. This structure also prevents damage to the cylinders 321, 322 when a temperature increase causes an abnormal hydraulic pressure increase. Furthermore, the hydraulic circuit withstands hydraulic pressure that is produced when momentary loads are applied to the cylinders 321, 322. In addition, degradation of the sealing performance of the seals used in the cylinders 213, 322 is prevented.

In the embodiment shown in FIGS. 13 and 14, the cracking pressure P applied to the relief valve 316 may be set at a value that is higher then the limit pressure C of the seals and lower than the maximum capacity pressure of the cylinder 306. This structure also prevents damage to the cylinder 306 caused by an increase in the temperature of the hydraulic oil. Furthermore, the hydraulic circuit withstands pressure increases caused by momentary application of loads.

In the embodiments illustrated in FIGS. 13 and 14, the relief valve 316 may be eliminated as long as the upper limit of the pressure communicated from the oil chambers R1, R2 is restricted to the cracking pressure P. For example, a certain valve control device may be employed in lieu of the relief valve 316. In such case, the control device includes hydraulic pressure sensors, an electromagnetic control valve, and a valve controller. The pressure sensors detect the pressure in the oil chambers R1, R2. The electromagnetic control valve permits the flow of hydraulic oil from the oil chambers R1, R2 to the accumulator. The valve controller controls the electromagnetic control valve and releases the hydraulic oil into the accumulator when the pressure detected by the pressure sensors reaches the cracking pressure P.

In the embodiments illustrated in FIGS. 13 to 15, the relief valve 316 may be a direct action type valve or an equilibrium piston type valve. In this case, the hydraulic pressure produced in the oil chamber R2 during momentary application of load to the cylinder 306 may be varied.

In the embodiments illustrated in FIGS. 13 to 15, the flow of hydraulic oil from the oil chambers R1, R2 of the cylinder 306 need not be restricted by the electromagnetic control valve 310. For example, the flow of hydraulic oil from the oil chambers R1, R2 may be restricted by an electromagnetic proportional flow rate control valve. In this case, the opening of the control valve may be varied in a continuous manner and the flow of a certain amount of hydraulic oil may be permitted when restricting the tilt of the rear axle. As another option, the control valve may be controlled to restrict the opened time period (duty ratio) of the control valve and permit the flow of a certain amount of hydraulic oil. This structure suppresses the tilting speed of the axle with respect to the body frame when restricting the tilt of the rear axle.

In each of the preferred and illustrated embodiments, the present invention is applied to a forklift. However, the present invention may be applied to other types of industrial vehicles that have axles that are tiltable with respect to the body frame, such as a wheel loader.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. An industrial vehicle having an axle pivotally supported on a frame, the vehicle comprising:

a damper for connecting the axle to the frame, wherein the damper allows the axle to pivot with respect to the frame when the damper expands or contracts;

a conduit connected with the damper for permitting oil to enter and exit the damper;

a control valve device connected to the conduit;

a controller for controlling the control valve device, wherein the controller selectively opens the control valve device to permit oil to enter the damper from the conduit and selectively closes the control valve device to stop fluid from entering the damper from the conduit;

a pressure adjuster that is normally connected to the conduit, wherein the pressure adjuster replenishes the conduit with fluid if fluid leaks from the damper, and wherein the pressure adjuster is disconnected from the conduit when the oil pressure in the conduit increases beyond a predetermined level due to loading of the damper;

an accumulator chamber in the pressure adjuster;

an adjuster passage extending from the conduit to the accumulator chamber;

a throttle passage connected to the adjuster passage and extending between the conduit and the accumulator chamber, wherein the throttle passage limits the flow of oil between the conduit and the accumulator chamber; and a one way valve device connected to the adjuster passage for suppressing flow of the oil from the conduit to the accumulator chamber and for allowing flow of the oil from the accumulator chamber to the conduit.

2. The vehicle according to claim 1, where in the damper includes:

a cylinder connected to one of the frame and the axle;

a piston located within the cylinder for reciprocal movement; and a rod for connecting the piston to the other of the frame and the axle;

wherein an interior of the cylinder is divided by the piston into first and second oil chambers;

wherein the conduit has first and second ends, the first end being connected to the first oil chamber and the second end being connected to the second oil chamber.

3. The vehicle according to claim 2 further comprising a restriction located in the conduit between the control valve device and the pressure adjuster for controlling the flow rate of the oil in the conduit.

4. The vehicle according to claim 2 further comprising:

a control valve bypass passage located between the first oil chamber and the second oil chamber; and a bypass valve for selectively opening and closing the control valve bypass passage.

5. The vehicle according to claim 2, wherein the control valve device includes a pair of electromagnetic valves respectively connected to the first and second oil chambers via the conduit.

6. The vehicle according to claim 5 further comprising a restriction located in the conduit between the pair of electromagnetic valves.

7. The vehicle according to claim 1, wherein the control valve device, the accumulator chamber, the one way valve device and the throttle passage are integrally assembled with the damper.

8. The vehicle according to claim 1, wherein the industrial vehicle has a fork lift implement.

* * * * *

UNITED STATES PATENT AND TRADEMARK OFFICE
CERTIFICATE OF CORRECTION

PATENT NO.   : 6,129,368
DATED        : October 10, 2000
INVENTOR(S)  : Kazuo Ishikawa It is certified that error appears in the above-identified patent and that said Letters Patent is hereby corrected as shown below:

<u>Title page,</u>
Item [73], Assignee, please delete "Sesakusho" and insert therefor -- Seisakusho --

Signed and Sealed this

Twenty-seventh Day of August, 2002

Attest:

JAMES E. ROGAN
*Attesting Officer*   *Director of the United States Patent and Trademark Office*